July 1, 1941.   A. H. WOLF ET AL   2,247,678
SLICED BREAD LOAF FRACTIONATING MECHANISM
Filed June 21, 1939   4 Sheets-Sheet 1

INVENTORS
Anthony H. Wolf.
Walter A. Thum.
BY
ATTORNEY

July 1, 1941. A. H. WOLF ET AL 2,247,678
SLICED BREAD LOAF FRACTIONATING MECHANISM
Filed June 21, 1939 4 Sheets-Sheet 2

INVENTORS
Anthony H. Wolf,
Walter A. Thum,
ATTORNEY

July 1, 1941.     A. H. WOLF ET AL     2,247,678
SLICED BREAD LOAF FRACTIONATING MECHANISM
Filed June 21, 1939     4 Sheets-Sheet 3
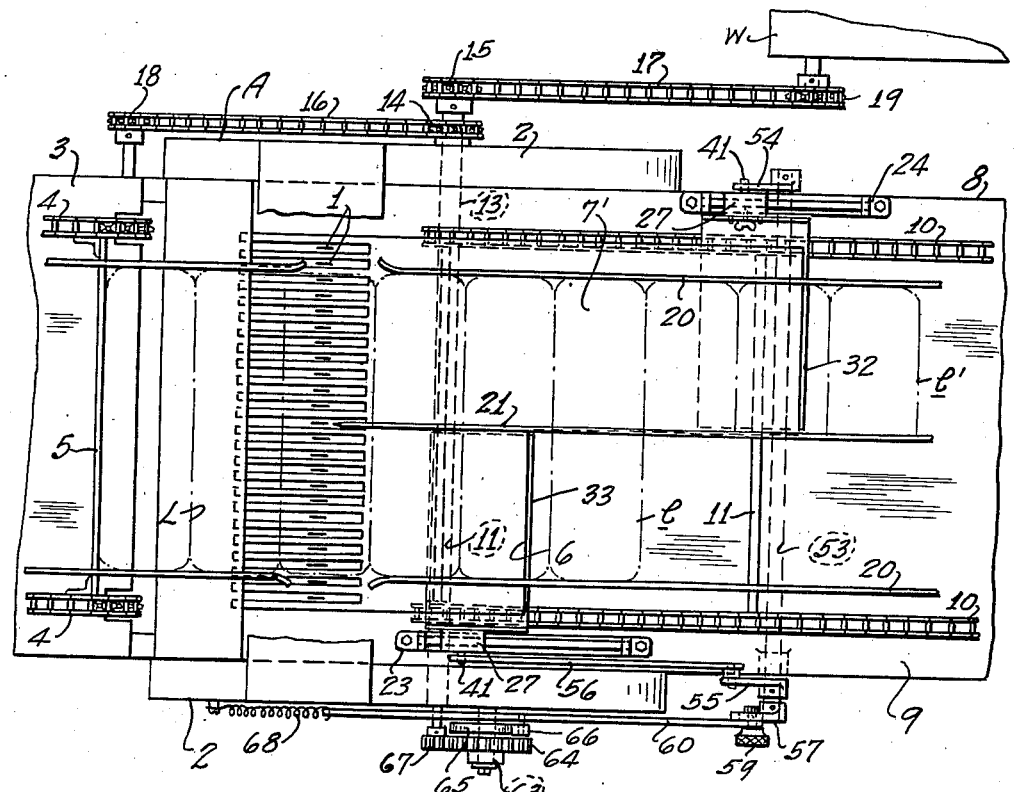
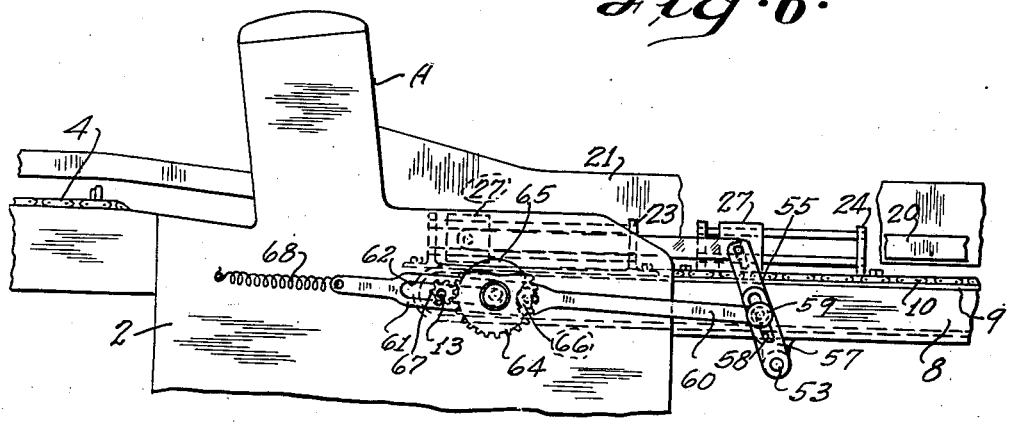
INVENTORS
Anthony H. Wolf.
Walter A. Thum.
BY
ATTORNEY

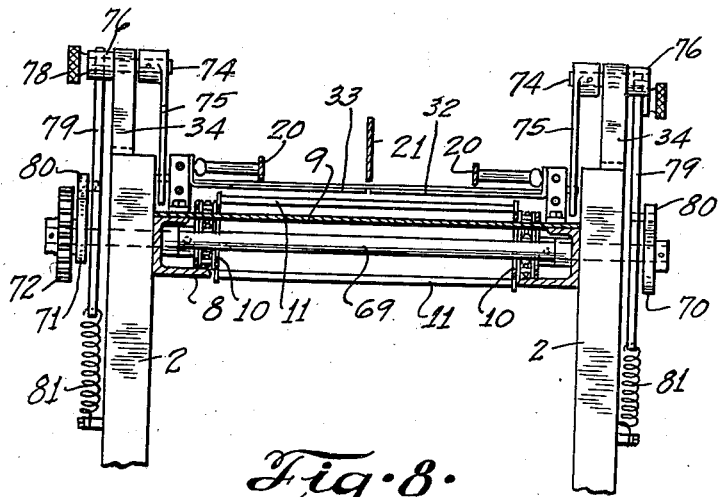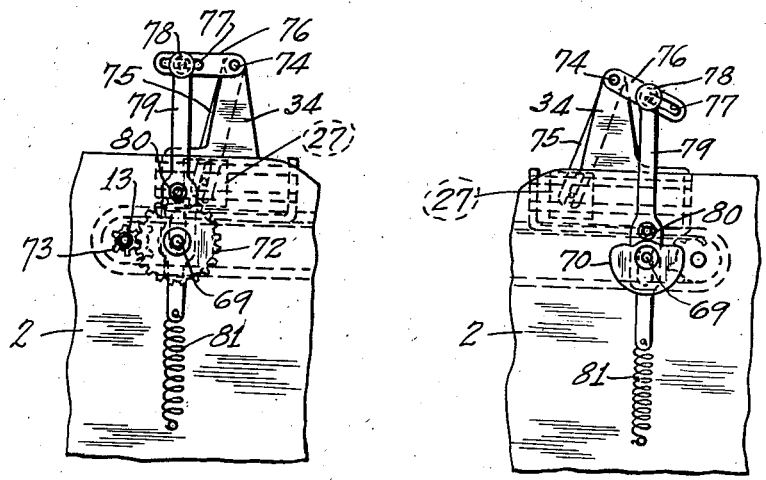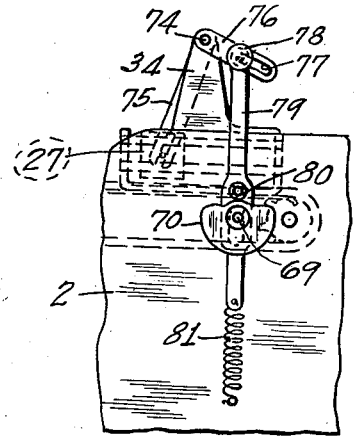

Patented July 1, 1941

2,247,678

UNITED STATES PATENT OFFICE 2,247,678

SLICED BREAD LOAF FRACTIONATING MECHANISM

Anthony H. Wolf and Walter A. Thum, St. Louis, Mo., assignors to Papendick, Inc., St. Louis, Mo., a corporation of Missouri Application June 21, 1939, Serial No. 280,398

14 Claims. (Cl. 146—153)

This invention relates generally to sliced bread handling equipment. More particularly, our invention relates to a certain new and useful improvement in equipment of the type known as sliced bread loaf fractionating mechanism and has for its primary object the provision of mechanism uniquely constructed and operating for positively fractionating the sliced loaf and depositing the loaf fractions for progression in a single row and in a substantially definite predetermined timed relation.

Our invention has for a further object the provision of mechanism of the type and for the purpose stated which is simple in structure, which is especially adapted for the handling of bread loaves of irregular shape, such as rye bread and Vienna bread, for instance, which effects dispositions of the several loaf fractions in proper sequence or phase in the cycle of operation of the conveying machinery, and which is highly efficient in the performance of its stated functions.

And with the above and other objects in view, our invention resides in the novel features of form, construction, arrangement, and combination of parts presently described and pointed out in the claims.

In the accompanying drawings (4 sheets):

Figure 6 is a fragmentary plan view of a slightly modified form of bread loaf fractionating mechanism constructed in accordance with and embodying our present invention;

Figure 7 is a side elevational view of the mechanism of Figure 6;

Figure 8 is a fragmental transverse sectional view of a second slightly modified form of bread loaf fractionating mechanism constructed in accordance with and embodying our invention;

Figure 9 is a fragmental elevational view, partly broken away and in section, of one side of the mechanism of Figure 6; and Figure 10 is a similar view of the opposite side of the fractionating mechanism of Figure 6.

Figure 1:
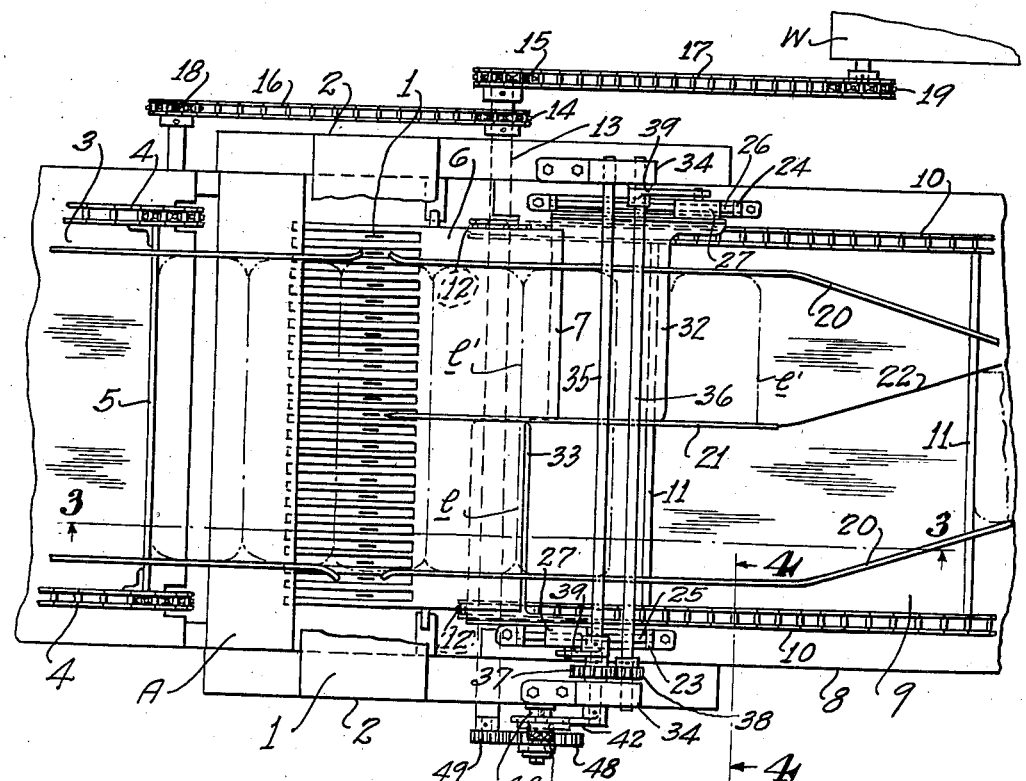
Figure 1 is a fragmentary plan view of bread loaf fractionating mechanism embodying our present invention.

Referring now in more detail and by reference characters to the drawings, which illustrate practical embodiments of our invention, the mechanism includes a loaf slicer A preferably of the vertical reciprocating knife type, the head 1 of which is operatively supported upon a pair of connected parallel side frames 2. Disposed rearwardly of the intake side of the head 1, is a feed-conveyor assembly 3 preferably of the pusher type comprising a pair of opposed parallel conveyor chains 4 operatively supporting a plurality of spaced parallel flight-bars 5.

Mounted at its side or lateral margins upon the side frames 2 and extending horizontally across the forward or discharge side of the slicing head 1, is a delivery plate 6 provided preferably integrally along approximately half of its forward margin with a forwardly projecting extension 7.

Operatively mounted on, and extending forwardly from, the side frames 2, is a transfer or discharge conveyor assembly 8 comprising a table 9 projecting at its receiving end for a short distance beneath the forward margin of the delivery plate 6. Mounted for operative movement over the table 9, is a pair of transversely spaced parallel chains 10 connected by a plurality of spaced parallel flight-rods 11 and trained over drive sprockets 12, in turn, operatively mounted upon a transverse drive shaft 13 journaled in, and projecting at its opposite ends through, the side frames 2. At its one projecting end, the drive shaft 13 is provided with a pair of sprockets 14, 15, in turn, respectively connected by means of drive chains 16, 17, to a drive sprocket 18 of the feed conveyor chains 4 and a drive sprocket 19 of the associated main wrapping machine W, it being evident that the feed conveyor chains 4, the discharge conveyor chains 10, and the wrapping machine W are simultaneously driven in a predetermined timed relationship.

Operatively mounted above the discharge plate 6 and extending forwardly over the conveyor table 9, is a pair of companion-shaped side guides 20 and an intermediate divider blade 21, the latter being provided at its forward end with a flexible switching guide 22, all as best seen in Figure 1 and as more fully and particularly described and disclosed in the co-pending and related application of Gustav C. Papendick for patent for Sliced loaf fractionating means, Serial No. 242,430, filed November 25, 1938.

Figures 3, 4, 5:
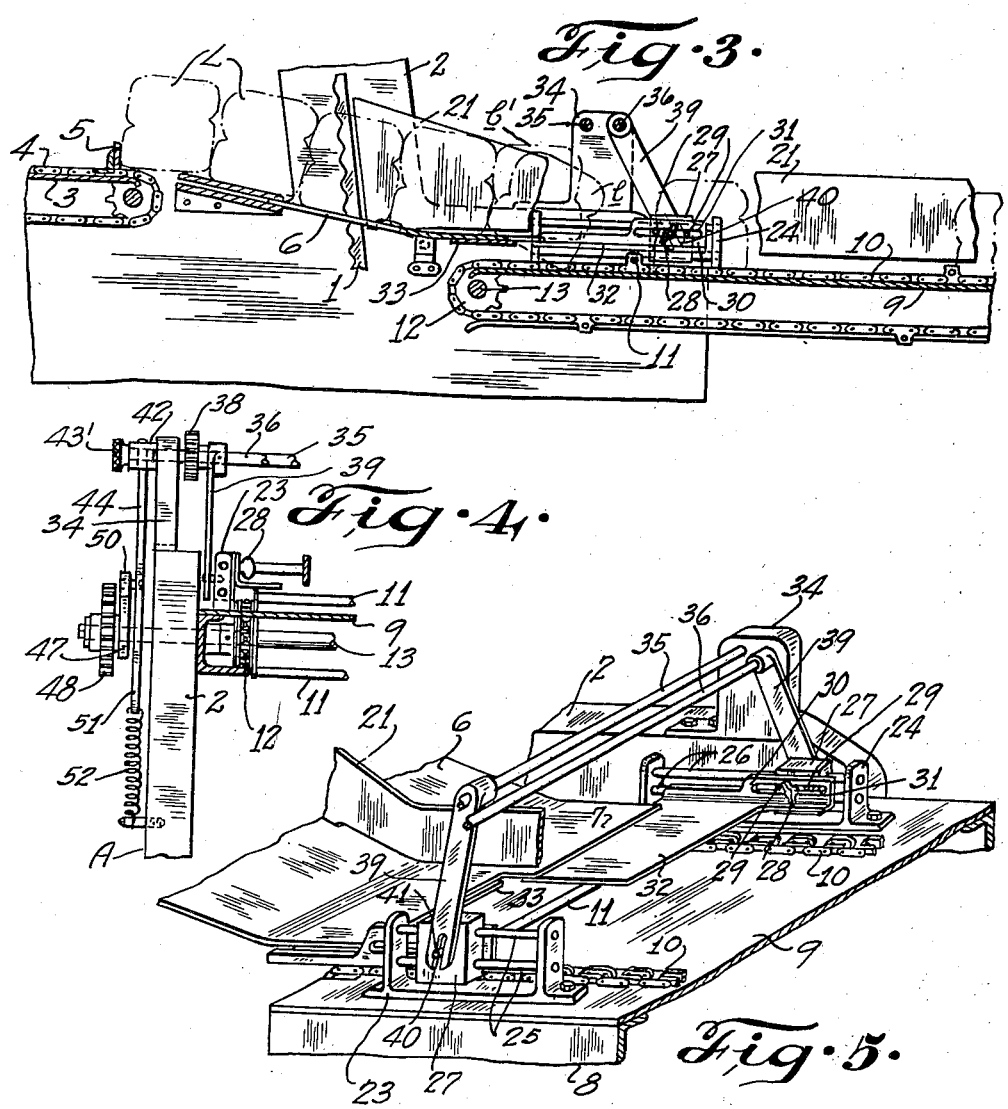
Figure 3 is a longitudinal sectional view of the mechanism, taken approximately along the line 3—3, Figure 1.
Figure 4 is a transverse sectional view of the mechanism, taken approximately along the line 4—4, Figure 1.
Figure 5 is a fragmentary perspective view of the bread loaf fractionating mechanism.

Bolted or otherwise fixed upon the upper face, and extending longitudinally along the opposite side margins, of the table 9 adjacent the forward margin of the delivery plate 6, are U-shaped brackets 23, 24, having their legs upwardly presented and supporting pairs of vertically spaced horizontally disposed guide rods 25, 26, the bracket 24 and its associated rods 26 being substantially longer than the bracket 23 and its associated rods 25, as best seen in Figure 5. Shiftably mounted on the pairs of slide rods 25, 26, are slide blocks 27, each provided with a transversely projecting wing screw 28 and a pair of horizontally aligned transversely projecting guide pins 29, all as best seen in Figures 3 and 5 and for purposes presently fully appearing.

Projecting transversely to approximately the center line of the delivery plate 6 beneath the extension or lip 7 thereof and provided along its outer side margin with an upstanding flange or extension 30 longitudinally slotted, as at 31, for adjustably accommodating the wing screw 28 and pins 29, is a so-called fractionating plate 32.

Similarly mounted upon the other slide block 27, is a second fractionating plate 33 extending horizontally beneath the delivery plate 6 for the remainder of its length and being substantially narrower in width longitudinally of the machine than the fractionating plate 32, all as best seen in Figures 1 and 5 and for purposes presently fully appearing.

Bolted or otherwise rigidly secured upon the side frames 2, is a pair of opposed parallel pedestals or posts 34, journaled upon which for axial oscillation and extending transversely of the machine over the rods 25, 26, is a pair of spaced parallel rods 35, 36, having intermeshing pinions 37, 38. Fixed to the rods 35, 36, adjacent their opposite ends, are downwardly presented crank arms or links 39 each bifurcated at its lower extremity, as at 40, for embracingly engaging an actuating stud 41 operatively projecting from the outwardly presented side face of the respective slide blocks 27, all as best seen in Figure 5 and for purposes presently fully appearing.

Figure 2:
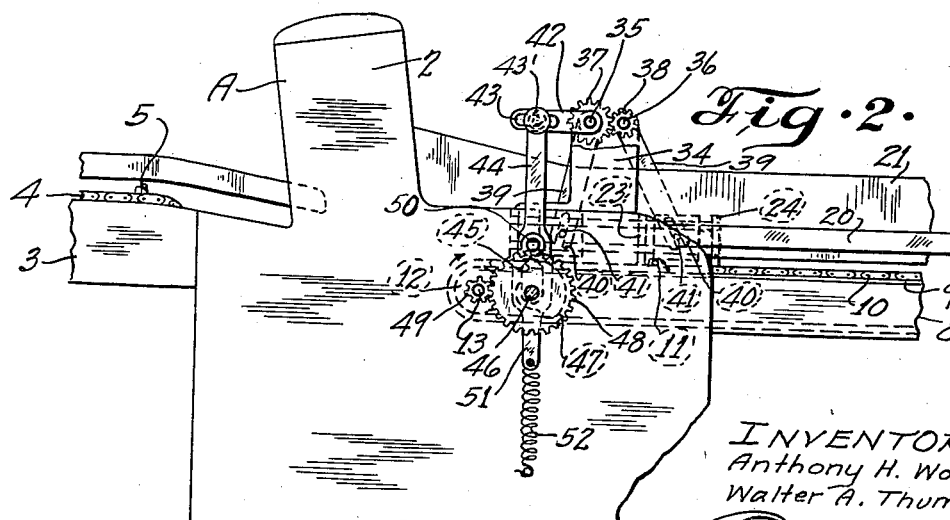
Figure 2 is a side elevational view of the mechanism of Figure 1.

At its one end, the rod 35 projects through one of the posts 34 and has fixed thereto one end of a radially extending crank arm or link 42 having an elongated slot 43 for adjustable connection by a screw 43' with the upper end of a vertically disposed reciprocatory link 44 longitudinally provided, in turn, with a slot 45 for loosely accommodating a stub-shaft 46 journaled at its one end in the outer face of a side frame 2. Fixed on the shaft 46, is a cam 47 and a gear 48, the latter having meshing engagement with a driving pinion 49 mounted on the other extended end of the drive shaft 13. Offset on the link 44 and engaging the surface of the cam 47, is a follower 50, and at its lower extremity, the link 44 is provided with an eye 51 for connection with one end of a tension spring 52, in turn, at its other end connected upon a side frame 2 for normally urging the link 44 yieldingly downwardly and holding the cam-follower or roller 50 operatively in engagement with the surface of the cam 47, all as best seen in Figures 2 and 4 and for purposes presently appearing.

In use and operation, unsliced bread loaves L are fed in continuous succession into the slicer A by the pusher bars 5 of the feed conveyor chains 4. By reference to Figure 1, it will be evident that the movement of the bread loaves L through the slicing-knives or head 1 and across the delivery-plate 6 is intermittent by reason of the fact that each loaf L is directly pushed through the head 1 by the next succeeding loaf, which, in turn, is progressed forwardly by the particular pusher bar 5 by which it is engaged. The pusher bars 5 are, in turn, spaced apart by a distance substantially greater than the actual width of any particular bread loaf L, so that there is a substantial distance between the rearwardly presented side face of each respective bread loaf L and the forwardly presented side face of the next succeeding bread loaf L, thus introducing a so-called idle period equivalent to the length of time required for the feed conveyor chains 4 to traverse such distance or free space and bring the next succeeding loaf L into facewise abutting or pushing engagement with the preceding loaf L.

As each loaf L progresses or moves forwardly across the delivery-plate 6 from the discharge side of the slicer head 1, such loaf L is divided into two loaf fractions $l$, $l'$, by the divider plate 21. Meanwhile the pinion 49, turning with the transfer conveyor drive shaft 13, transmits rotatory movement through its meshing gear 48 to the cam 47, which, in turn, vertically reciprocates the connecting link 44, a rocking or oscillatory movement being thereby transmitted through the crank arm 42 and the intermeshing gears 37, 38, to the shafts 35, 36, and to the associated arms 39, and an alternate shifting movement of the fractionating plates 32, 33, being effected. The cam 47 is so shaped and timed in relation to the movement of the feed conveyor chains 4 and the transfer conveyor chains 10, that, during each idle period, the fractionating plate 33 will be shifted rearwardly beneath the delivery plate 6, a flight rod 11 will be emerging from beneath the delivery plate 6 into bread loaf engaging position, and the fractionating plate 32 will be shifted forwardly into fraction-supporting position substantially as shown in Figures 1 and 5.

As the loaves L are progressed across the delivery plate 6, the one loaf fraction $l$ will move over the forward margin of the delivery-plate 6 and be deposited upon the conveyor table 9 in front of the oncoming flight rod 11. The other loaf fraction $l'$ will move across the hold-back lip 7 and the extended fractionating plate 32, coming to rest momentarily thereon during the idle period. Meanwhile, the particular loaf fraction $l$ is progressed forwardly under the influence of the flight rod 11 a sufficient distance, so that the particular flight rod 11 will have moved substantially beyond the forward margin of the loaf fraction $l'$ at the end of or during the idle period. Thereupon, the bread loaves L again take up forward movement, the fractionating plate 33 is shifted forwardly into extended position, the fractionating plate 32 is retracted beneath the lip 7 of the delivery plate 6, and said loaf fraction $l'$ is pushed over the forward margin of the hold-back lip 7 and deposited upon the conveyor table 9 in front of the next succeeding flight rod 11. As the bread loaves L continue their forward movement, the loaf fraction $l$ of the next succeeding loaf L moves outwardly upon the now forwardly shifted fractionating plate 33 and the fraction $l'$ of such succeeding loaf L moves over the hold-back lip 7 of the delivery plate 6 and is thereby prevented from being deposited upon the conveyor table 9 behind the previously deposited loaf fraction $l'$. Approximately as the next idle period begins, the fractionating plate 32 is shifted outwardly into extended position, the fractionating plate 33 is shifted rearwardly beneath the delivery plate 6 for depositing the next succeeding loaf fraction l, and the cycle of fractionating operation is repeated. In such manner, the fractions of the several succeeding sliced loaves L are deposited on the table 9 in staggered relation and in due course by the conveyor-chains 10 and the converging side-guides 20 progressed in a consecutively aligned series to, and in timed relation with, the wrapping machine W.

By reason of the fact that there is only one idle period of each full loaf L, it is necessary to time the various fractionating operations with respect to such idle period, so as to materially reduce or entirely prevent the likelihood of depositing more than one loaf fraction during each phase of a fractionating cycle. In the present mechanism, such timing is accomplished by utilization of the hold-back lip 7 and by increasing the width of the fractionating plate 32 with respect to the width of the fractionating plate 33. It will, of course, be evident that, by further increasing the width of the fractionating plate 32 and also increasing the amplitude of its shifting movement, the hold-back lip 7 may be dispensed with entirely.

As has been above pointed out, the length of the idle period is largely dependent upon the width of the particular bread loaves L which are being fractionated. In handling baked loaves which have been panned or otherwise baked in a shape-preserving manner, the width of each bread loaf will be substantially constant and, therefore the idle period will be substantially constant. There are, however, a number of types of bread, such as rye bread and Vienna bread, which are hearth baked and are not precisely uniform in shape and width. It will be evident that, in the case of the latter type of bread, the idle period will not be uniform. With the present fractionating mechanism, it is immaterial whether the idle period is or is not uniform. In addition, the present fractionating mechanism is relatively non-critical and does not require exceedingly precise timed adjustment, since the present mechanism takes advantage, so to speak, of the idle period to separate or space the fractionating operations and thereby compensate for minor variations and fluctuations in the timed relationship between the feed conveyor chains 4 and the transfer conveyor chains 10.

The present fractionating mechanism further may be very simply and quickly adjusted for handling different types of bread merely by loosening the wing screws 28 and shifting the fractionating plates 32, 33, to different relative positions upon the slide blocks 27, thereby enabling the machine to handle a quantity of long narrow Vienna bread loaves followed by a quantity of relatively wide hearth baked rye bread loaves without material loss of time for effecting major adjustments.

A modified loaf fractionating and transferring mechanism of our invention is illustrated in Figures 6 and 7. Such mechanism is substantially identical in all respects to the previously described embodiment, except that the delivery plate 6 is provided with an elongated hold-back tongue 7' adapted to support a plurality of loaf fractions in overhanging relationship above the conveyor table 9. Accordingly, the supporting bracket 24 is positioned a substantial distance forwardly of the supporting bracket 23 in order to permit the frationating plate 32 to shift from extended position to retracted position beneath the forward margin of the elongated hold-back lip 7', all as best seen in Figure 6.

Suitably journaled on, and extending transversely under, the table 9 adjacent the forward supporting bracket 24, is a rock shaft 53 provided on its opposite extended ends with identically shaped rock arms 54, 55, the arm 54 being slotted at its end for slidable engagement with the pin 41 of the forward slide block 27, and the arm 55 being pivotally connected at its end to a horizontal link 56, in turn, operatively engaged with the pin 41 of the rearward slide block 27, also as best seen in Figure 6.

Fixed on one extended end of the rock shaft 53, is a crank arm 57 provided with a longitudinally extending slot 58, fitting in which is the shank of a screw member 59, and pivoted at one end upon the screw shank 59 is a horizontally disposed driving link 60 provided intermediate its ends with a yoke 61 having a slot 62 sized for slidably embracing the conveyor drive shaft 13. Fixed at one end in, and extending outwardly from, a side frame 2 of the slicer A through the yoke slot 62, is a stub shaft 63, rotatably mounted upon which is a driven gear 64 provided on its inner face with a cam 65 for driving engagement with a cam following roller 66 operatively mounted on the connecting link 60, the gear 64 being in meshing engagement with a driving pinion 67 mounted on the extended end of the conveyor drive shaft 13. It will be understood that the stroke of the fractionating plates 32 and 33 may be readily adjusted or regulated by shiftable adjustment of the screw member 59 in the slot 58.

At its rearward extremity, the connecting link 60 is operatively connected to one end of a tension spring 68 secured at its other end upon a side frame 2 of the slicing machine A for maintaining the cam follower 66 and cam 65 in cooperative engagement, all as best seen in Figure 7 and for purposes presently appearing.

The cam 65 is preferably shaped and timed in relation to the movement of the feed conveyor chains 4 and transfer conveyor chains 10, so that both fractionating plates 32, 33, are simultaneously retracted or shifted beneath the hold-back lip 7' and delivery plate 6, respectively, at the beginning of or during the idle period introduced by the spacing between the pusher bars 5 of the feed conveyor chains 4. It will thus be evident that a loaf fraction will be deposited over the forward margin of the hold-back lip 7' in front of one oncoming flight bar 11 and, at the same time, a different fraction will be deposited in front of the next succeeding flight bar 11.

For high-speed operations and for the handling of hearth baked bread having an extremely wide variation in size and shape, a further modified form of the present mechanism is shown in Figures 8 and 9. Such form is substantially identical with the preferred embodiment first described, but additionally includes a jack shaft 69, which is journaled in, and extends through, the side frame 2 and is provided on one end with a cam 70 and on its other end with a cam 71 and a driven gear 72 for meshing engagement with a driving pinion 73 operatively mounted on the main drive shaft 13 of the transfer conveyor assembly 8, as shown.

Journaled in, and extending through, the pedestals 34, are rock shafts 74 each provided on its inner end with a rock arm 75 substantially identical in all respects to the rock arm 39 for shiftably actuating the slide blocks 27. Fixed upon the outer end of each shaft 74, is a crank arm 76 longitudinally slotted, as at 77, for adjustable connection by a screw 78 with the upper end of a vertically reciprocable connecting arm 79 substantially identical with the connecting arm 44 and each in like manner having a cam follower 80 for engagement, respectively, with the cams 70, 71, and each being normally urged downwardly for cam following engagement by a tension spring 81, all as best seen in Figures 8, 9, and 10 and for purposes presently fully appearing.

The cams 70, 71, are so shaped and timed with respect to each other and with respect to the timing of the feed conveyor chains 4 and the transfer conveyor chains 10 as to independently shift the fractionating plates 32, 33, with or without reference to the idle period as the particular circumstances of the operation and the type of bread may require. In addition, the fractionating plates 32, 33, may be separately shifted outwardly to extended position simultaneously with the movement of the particular flight rod which is engaged with the loaf fraction just deposited by the particular fractionating plate, thereby positively preventing the deposition of more than one loaf fraction during any given phase of the loaf fractionating cycle.

In addition, the fractionating plates 32, 33, may be timed to shift forwardly into extended position in advance of the flight rods 11, as well as simultaneously with the flight rods 11, in which cases the forward or leading edges of the fractionating plates 32, 33, act as conveying pushers in substantially the same manner as the flight rods 11, thereby enabling the mechanism to handle a wide variety of different kinds of bread loaves in a number of different ways to achieve most satisfactory results under any particular set of conditions.

The mechanism fulfills in every respect the objects stated, and it should be understood that changes and modifications in the form, construction, arrangement, and combination of the several parts of the mechanism may be made and substituted for those herein shown and described without departing from the nature and principle of our invention.

Having thus described our invention, what we claim and desire to secure by Letters Patent is:

1. Bread loaf fractionating mechanism including, in combination, a stationary delivery-plate, a divider plate, a pair of movable plates disposed on opposite sides of the divider plate and shiftable from loaf-supporting position forwardly of the delivery plate to a position under the delivery-plate, and means for shifting the movable plates in predetermined timed relation to each other.

2. Bread loaf fractionating mechanism including, in combination, a stationary delivery-plate, a divider plate, conveyor means, a pair of separately movable plates for receiving different loaf fractions from the delivery-plate, and means for shifting the movable plates at spaced intervals and in such a manner as to displace therefrom the so-received loaf fractions for separately depositing such loaf fractions on the conveyor means.

3. Bread loaf fractionating mechanism comprising, in combination, a delivery-plate, a conveyor operatively mounted in spaced relation to, and extending forwardly from the discharge margin of, the delivery-plate, a pair of plates disposed on opposite sides of the conveyor adjacent the delivery-plate and being reciprocable from a position forwardly of the delivery-plate to a position under the delivery-plate, said movable plates extending transversely across the delivery-plate into substantially contiguous relationship along their opposed lateral margins and being of such width as to project when in forwardly extended position a substantial distance beyond the discharge margin of the delivery-plate, and means for actuating said plates in predetermined timed relation to each other for delivery of the loaf-fractions from the delivery-plate to the conveyor.

4. Bread loaf fractionating mechanism comprising, in combination, a delivery-plate, a conveyor operatively mounted in downwardly spaced relation to, and extending under the discharge margin of, the delivery-plate, a pair of horizontal slides mounted on opposite sides of the conveyor adjacent the delivery-plate, a pair of co-planar plates mounted on the slides for reciprocable movement intermediate the conveyor and the delivery-plate from a position forwardly of the delivery-plate to a position under the delivery-plate, said co-planar plates extending transversely across the delivery plate into substantially contiguous relationship along their opposed lateral margins and being of such width as to project when in forwardly extended position a substantial distance beyond the discharge margin of the delivery-plate, and means for actuating said plates in predetermined timed relation to each other and to the conveyor means for delivery of the loaf-fractions from the delivery-plate to the conveyor.

5. In a bread loaf fractionating mechanism, a conveyor table, means for progressing loaf-fractions forwardly along the table, a first shiftable plate, a second shiftable plate mounted substantially in the same plane with and in forwardly spaced relation to the first plate and supported independently thereof, and actuating means including a cam operably connected to said plates for shifting the first plate forwardly and the second plate rearwardly, holding said plates in such shifted position for a predetermined time, returning said plates to initial position, and holding said plates in such initial position for a predetermined time.

6. In bread loaf fractionating mechanism, a conveyor table, means for progressing loaf-fractions forwardly along the table, a first shiftable plate, a second shiftable plate independent of the first plate and being mounted substantially in the same plane with and in forwardly spaced relation to said first plate, and driving means connected to each of said plates and including cam means for shifting the first plate forwardly in a direction parallel to the direction of movement of the loaf-fractions and the second plate rearwardly also in a direction parallel to the direction of movement of the loaf-fractions, holding said plates in such shifted position for a predetermined time, returning said plates to initial position, and then holding the plate in such initial position for a predetermined time.

7. In bread loaf fractionating mechanism, a first shiftable plate, a second shiftable plate mounted substantially in the same plane with and in forwardly spaced relation to the first plate, and actuating means operably connected to said plates for simultaneously shifting both of said plates rearwardly, holding said plates in such rearwardly shifted position for a predetermined time, returning said plates to initial position, and then retaining said plates at such initial position for a predetermined time.

8. Bread loaf fractionating mechanism including slicing means, a first conveyor for feeding a bread loaf to the slicing means, means for initially subdividing the sliced bread loaf into a plurality of fractions, second conveyor means for progressing the loaf-fractions away from the slicing means, fractionating means including separately actuable reciprocatory plates shiftable in the direction of travel of the loaf-fractions for alternately delivering the fractions to the second conveyor, and means for actuating the conveyors and plates in predetermined timed relation.

9. Bread loaf fractionating mechanism including slicing means, a first conveyor for delivering a succession of bread loaves to the slicing means, a delivery-plate for receiving the successively sliced loaves from the slicing means, means for subdividing each of the sliced loaves into a plurality of fractions, second conveyor means for progressing the loaf-fractions away from the slicing means, fractionating means comprising separately actuable reciprocatory plates shiftable toward and away from the delivery-plate for alternately delivering the fractions from the delivery-plate to the second conveyor means, and means for actuating the conveyor means and said plates in predetermined timed relation.

10. In bread loaf fractionating mechanism, means for subdividing a sliced bread loaf into a plurality of of fractions, a conveyor table having a plurality of chain-driven continuously moving flight rods for fraction-progressing movement thereacross, means for progressing the subdivided fractions forwardly along separate paths toward the conveyor table, a plurality of spaced horizontally reciprocable plates mounted above the conveyor table and respectively interposed in the paths of said fractions for arresting the forward movement of said fractions for a predetermined interval of time, and plate-actuating means synchronized with the movement of the flight rods for reciprocating the plates out of fraction-arresting position so as to simultaneously deposit one of the fractions upon the conveyor table forwardly of a selected flight rod for progression thereby and the other fraction upon the conveyor table rearwardly of such selected flight rod for ultimate progression by the next succeeding flight rod.

11. Bread loaf fractionating mechanism including a stationary delivery-plate, a divider plate, a pair of horizontally reciprocable plates disposed on opposite sides of the divider plate and shiftable from a position forwardly of, to a position under, the delivery-plate, a conveyor table extending forwardly from the delivery-plate and having a plurality of chain-driven continuously moving flight rods for fraction-progressing movement thereacross, and actuating means synchronized with the movement of the flight rods for reciprocating the movable plates in predetermined timed relation to each other and to the movement of the flight rods.

12. Bread loaf fractionating mechanism including means for initially subdividing a sliced bread loaf into a plurality of groups of slices, each group constituting a loaf-fraction, conveyor means for receiving the loaf-fractions, and means comprising reciprocatory members intermediate the subdividing means and the conveyor means for receiving said loaf-fractions from said subdividing means and alternately delivering the so-received loaf-fractions to the conveyor means.

13. Bread loaf fractionating mechanism including means for initially subdividing a sliced bread loaf into a plurality of groups of slices, each group constituting a loaf-fraction, conveyor means for receiving the loaf-fractions, means intermediate the subdividing means and the conveyor means for intermittently receiving said loaf-fractions from said subdividing means and delivering the so-received loaf-fractions to the conveyor means, and means for axially shifting the respective loaf-fractions during movement with the conveyor means.

14. Bread loaf fractionating mechanism including means for initially subdividing a sliced bread loaf into a plurality of groups of slices, each group constituting a loaf-fraction, conveyor means for receiving the loaf-fractions, means comprising reciprocatory members intermediate the subdividing means and the conveyor means for receiving said loaf-fractions from said subdividing means and alternately delivering the so-received loaf-fractions to the conveyor means, and means for axially shifting the respective loaf-fractions during movement of the conveyor means for progression in a single path.

ANTHONY H. WOLF.
WALTER A. THUM.